(12) United States Patent (10) Patent No.: US 7,750,797 B2
Laure et al. (45) Date of Patent: Jul. 6, 2010

(54) METHOD AND DEVICE FOR THE DETECTION OF THE SEPARATION OF AN ELECTRONIC MODULE FROM A VEHICLE TO WHICH IT IS MOUNTED

(75) Inventors: Frédéric Laure, Tournefeuille (FR); Dominique Luce, Bordes de Riviere (FR)

(73) Assignee: Continental Automotive France, Toulouse (FR)

( * ) Notice: Subject to any disclaimer, the term of this patent is extended or adjusted under 35 U.S.C. 154(b) by 506 days.

(21) Appl. No.: 11/659,734

(22) PCT Filed: Aug. 5, 2005

(86) PCT No.: PCT/EP2005/008524

§ 371 (c)(1),
(2), (4) Date: Mar. 8, 2007

(87) PCT Pub. No.: WO2006/042577

PCT Pub. Date: Apr. 27, 2006

(65) Prior Publication Data

US 2007/0257666 A1    Nov. 8, 2007

(30) Foreign Application Priority Data

Aug. 10, 2004    (FR)    .................................. 04 08765

(51) Int. Cl.
*B60C 23/00* (2006.01)
(52) U.S. Cl. ....................... 340/442; 340/447; 340/445; 73/146; 73/146.4
(58) Field of Classification Search ......... 340/442–447; 73/146–146.5
See application file for complete search history.

(56) References Cited

U.S. PATENT DOCUMENTS

| | | | | |
|---|---|---|---|---|
| 5,552,759 A | * | 9/1996 | Stoyka | 340/426.33 |
| 5,731,754 A | * | 3/1998 | Lee et al. | 340/447 |
| 6,034,596 A | * | 3/2000 | Smith et al. | 340/447 |
| 6,771,169 B1 | * | 8/2004 | Kaminski et al. | 340/442 |

(Continued)

FOREIGN PATENT DOCUMENTS

| | | |
|---|---|---|
| DE | 102 55 324 | 6/2004 |
| DE | 103 16 705 | 10/2004 |

OTHER PUBLICATIONS

English language abstract of DE 60100669, published Jul. 8, 2004, which corresponds to US 2001/0019262.

*Primary Examiner*—Eric M Blount
(74) *Attorney, Agent, or Firm*—Young & Thompson

(57) ABSTRACT

A method of detecting the separation of an electronic module (1) from a vehicle on which the module is mounted. According to this method, the module (1) has associated with it an inductance (17) inseparable from the module, the inductance (17) and the associated module (1) are connected to an element of the vehicle, in the immediate vicinity of an element (18) made of ferromagnetic material, the current passing through the inductance (17) is measured (monitored), so as to detect any variation of current and, when a current variation greater than a predetermined variation threshold is detected, representative of a relative distance between the inductance (17) and the element made of ferromagnetic material (18), there is ordered the emission of a signal indicating the separation of the module (1) associated with the inductance from the vehicle.

19 Claims, 4 Drawing Sheets

U.S. PATENT DOCUMENTS

Figure 3:
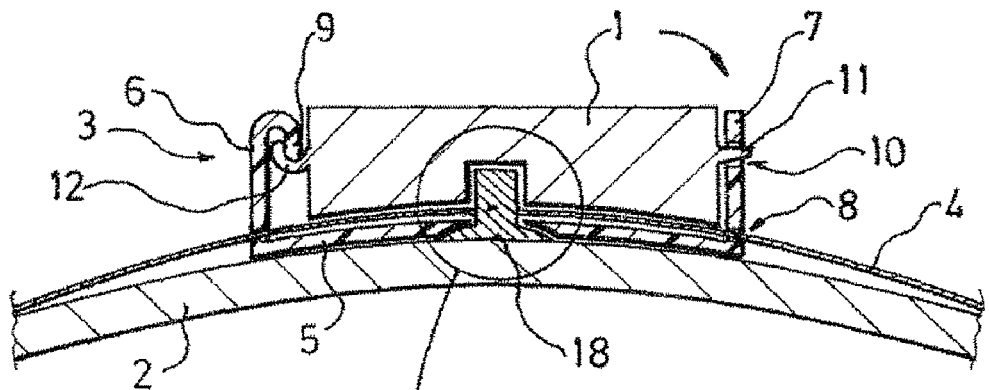

| | | | |
|---|---|---|---|
| 6,931,920 B2 * | 8/2005 | Modawell et al. | 73/146 |
| 6,956,466 B2 * | 10/2005 | Caretta et al. | 340/426.11 |
| 7,091,840 B2 * | 8/2006 | Ichinose | 340/447 |
| 7,254,994 B2 * | 8/2007 | Schulze | 73/146 |
| 7,271,709 B2 * | 9/2007 | Miller et al. | 340/442 |
| 7,370,522 B2 * | 5/2008 | Shimura | 73/146 |
| 2001/0019262 A1 | 9/2001 | Woolsey et al. | |
| 2002/0148286 A1 | 10/2002 | Losey | |
| 2004/0140890 A1 | 7/2004 | Hartmann et al. | |
| 2004/0233050 A1 * | 11/2004 | Burghardt | 340/445 |
| 2004/0261510 A1 | 12/2004 | Schulze | |
| 2005/0011257 A1 | 1/2005 | Modawell et al. | |
| 2005/0270148 A1 * | 12/2005 | Modawell et al. | 340/445 |
| 2006/0130570 A1 * | 6/2006 | Anders et al. | 73/146 |

* cited by examiner

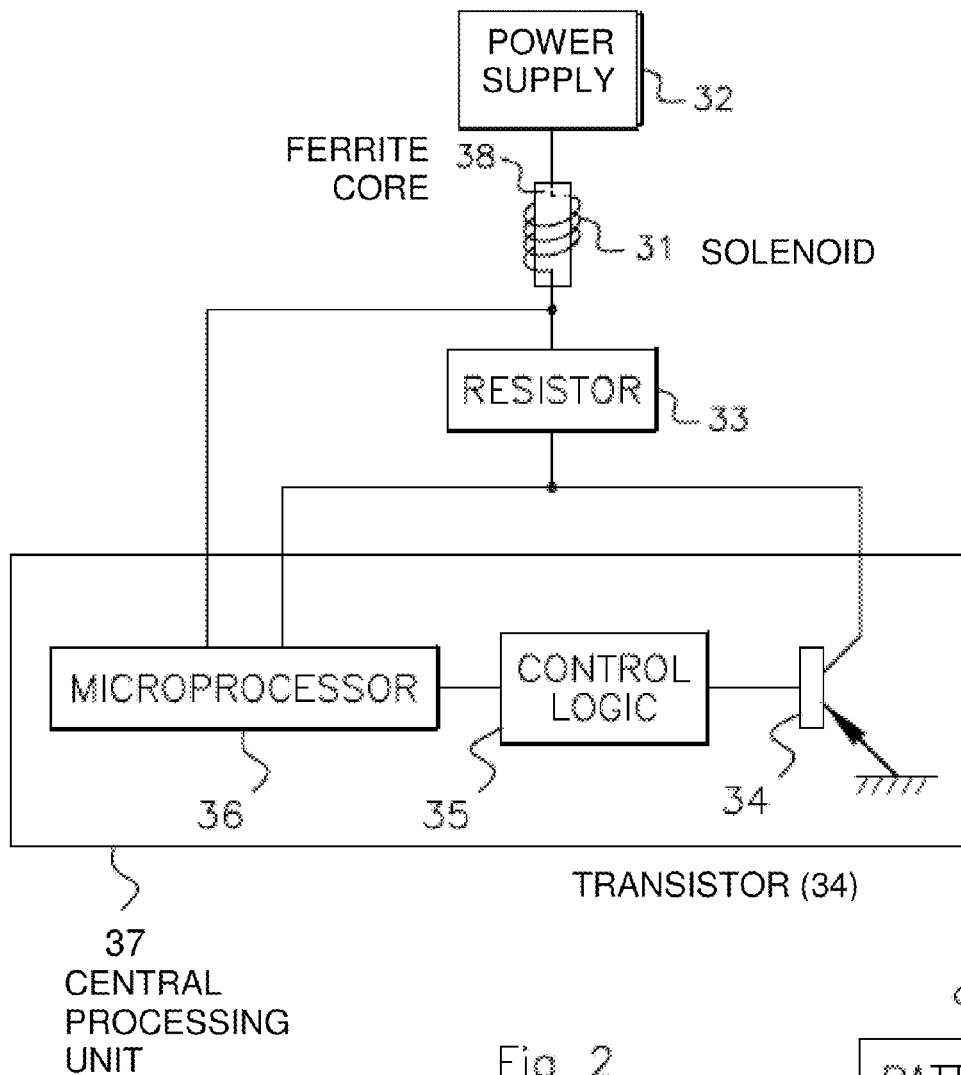
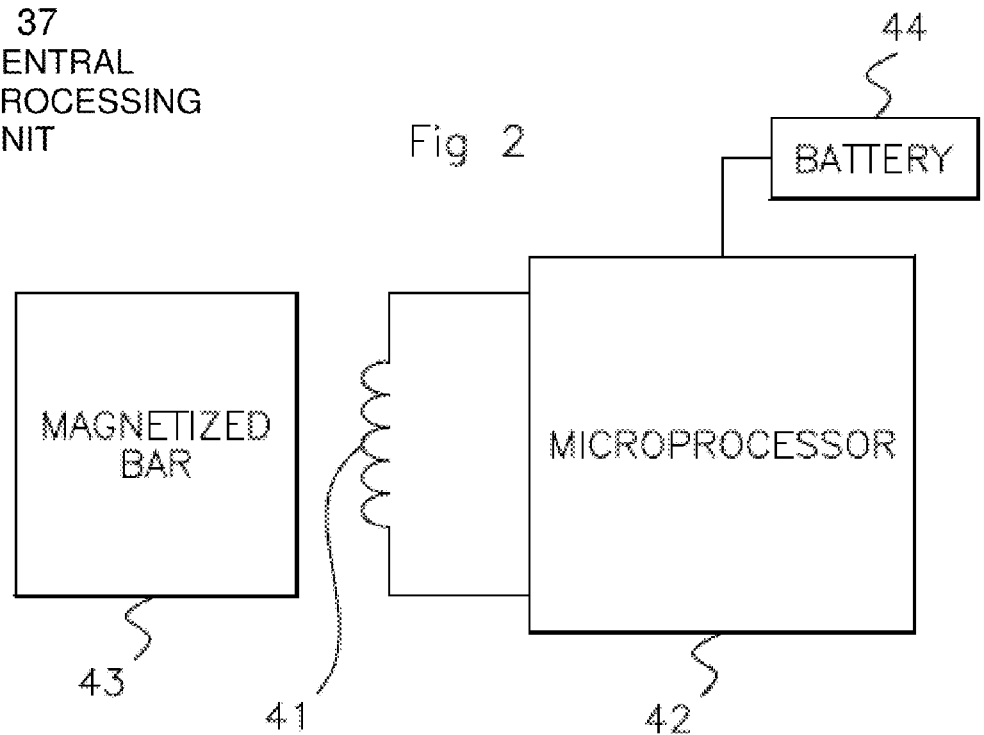

METHOD AND DEVICE FOR THE DETECTION OF THE SEPARATION OF AN ELECTRONIC MODULE FROM A VEHICLE TO WHICH IT IS MOUNTED

The invention relates to a method and a device for detecting the separation of an electronic module from a vehicle on which said module is mounted.

Motor vehicles are increasingly including systems for monitoring and/or measuring parameters comprising electronic modules provided with sensors mounted on said vehicle.

Typical of such systems are the systems for monitoring the pressure of the tires comprising sensors mounted on each wheel of the vehicles, dedicated to measuring parameters, such as pressure and/or temperature of the tires on these wheels, and intended to inform the driver of any abnormal variation of the measured parameter.

These systems for monitoring the pressure of the tires conventionally comprise:
- mounted on each wheel of the vehicle, an electronic module provided with a sensor, a microprocessor and a radiofrequency emitter,
- and, mounted on the vehicle, a central processing unit for receiving the signals emitted by the emitters, provided with a computer incorporating a radiofrequency receiver connected to an antenna.

The modules are, furthermore, each mounted on the rim of a wheel of the vehicle, and are conventionally fixed directly onto said rim, or inserted into a supporting cradle which is itself fixed to the rim, or incorporated in the inflating valve system fixed on this rim. They are therefore fixed either directly on the vehicle or on an element connected to the vehicle.

One of the risks to which all the electronic modules mounted on the vehicles are subject, and in particular the modules incorporated on the rims of the wheels of the vehicles, is the possibility of separation of these modules from said vehicles.

To refer to the abovementioned example, such a separation can occur following, for example, impacts experienced when fitting a tire or impacts experienced by the rim when the vehicle is being used.

At the present time, and assuming such a separation, the only indication that can, if necessary, be transmitted, consists of a message indicating a "defective" operation of the sensor mounted in the module.

However, such a message covers numerous faults and is in no way capable of providing information representative of the specific cause of its emission, namely the separation of the module from the vehicle.

The present invention aims to overcome this drawback; its main objective is to provide a method of detection that makes it possible, very reliably, to immediately signal a separation of an electronic module from the vehicle on which it is mounted. Particularly in the case of a separation of a module (incorporating a pressure and temperature sensor) from a wheel rim.

Another object of the invention is to provide a detection method requiring only a very low production overhead.

To this end, the invention aims, firstly, to provide a method of detecting the separation of an electronic module from a vehicle on which said module is mounted, characterized in that:
- each module has associated with it an inductance or any type of magnetic sensor, inseparable from said module, the inductance and the associated module are connected to the vehicle, in the immediate vicinity of an element made of ferromagnetic material connected to an element of the vehicle,
- a magnetic parameter of the inductance and/or the current passing through the inductance and/or the voltage at the terminals of the inductance is monitored so as to detect any variation of the parameter and/or of the current and/or of the voltage monitored,
- and, on detection of a variation of the parameter and/or of the current and/or of the voltage monitored, greater than a predetermined variation threshold, representative of a relative distance between inductance and element made of ferromagnetic material, the emission is ordered of a signal indicating the separation of the module from the element of the vehicle to which it was connected.

The basic principle of the invention was therefore to associate, with each electronic module mounted on a vehicle (or on an element of the vehicle such as a rim, etc.), a simple inductance incorporated in such a way as not to be able to be separated from said module, position this inductance in the immediate vicinity of an element made of ferromagnetic material connected to the vehicle, and detect any variations of the electromagnetic parameter monitored (for example, inductance, reactance, or other such value) or the current passing through said inductance or the voltage at the terminals of this same inductance. These variations are in fact representative, according to the principle stated by Lenz's law, of a relative distance between the inductance and the element made of ferromagnetic material, and therefore of the separation of the electronic module from the vehicle.

According to this principle, when a module becomes separated from the vehicle on which it is mounted, an alarm signal is emitted. Thus, in the case of a module including a sensor for monitoring and/or measuring parameters incorporating an emitter/receiver assembly, it is possible, through the emitter associated with said sensor, to emit an alarm message, to the central processing unit of said system. This central processing unit can, then, be easily programmed to trigger an audible and/or visual alarm informing the driver.

According to the invention, such an indication signal is therefore systematically and immediately emitted when an electronic module becomes separated from the vehicle on which it is fixed. The required measures can then be taken accordingly: for example, change the wheel when a sensor mounted on the rim of that wheel becomes separated (conventionally identified by the localization process performed by the associated monitoring system), stop at a garage, etc.

Furthermore, according to this method, the response time is very short (measured in tens of milliseconds), so that the indication is transmitted before the components, such as inductance, microprocessor, emitter, etc., are possibly destroyed by the impacts rapidly experienced after separation.

According to an advantageous embodiment aimed at conventional industrial production, such an inductance is incorporated in each electronic module designed to be connected to a vehicle (or to an element of the vehicle, such as a rim). As for the module, this is fixed to the vehicle, either directly, or indirectly with, for example, the insertion of a fixing mount.

According to another advantageous embodiment, the inductance is polarized by means of a current source connected in such a way as to power said inductance.

Such a polarization makes it possible, on a separation between inductance and element made of ferromagnetic material, representative of a separation of the module from said ferromagnetic element and therefore from the vehicle, to obtain a variation of the current passing through the inductance that is sufficiently great to be detected by means of low sensitivity. This polarization of the inductance therefore makes it possible to increase the effects of a separation of the module from the vehicle.

According to a first advantageous embodiment, an inductance is used that consists of a solenoid, and an element made of ferromagnetic material consisting of a core capable of being connected to the vehicle, in such a way as to penetrate longitudinally inside the solenoid.

According to the invention, this solenoid can advantageously be powered in such a way as to be passed through by a direct current on which the variations of the intensity are measured. Furthermore, advantageously, according to the invention, the direct current passing through the solenoid is then chopped, so as to reduce the consumption of the current conventionally produced by a battery mounted with the sensor.

For current-saving purposes, according to an advantageous variant of embodiment, the solenoid can also be powered so that the latter is passed through by an oscillating current, on which the amplitude variations of the intensity are measured, representative of the relative distance between inductance and element made of ferromagnetic material.

As an example of advantageous embodiment, the solenoid is thus powered by means of a square-wave signal.

According to a second advantageous embodiment of the invention, an element made of ferromagnetic material is used that consists of a magnetized bar that is connected to the vehicle (to the rim, for example) in such a way that it extends in the immediate vicinity of the inductance, and the voltage variations of the current passing through the inductance are detected.

Furthermore, the inductance is then advantageously powered in such a way as to be passed through by a direct current.

The invention extends to a device for detecting the separation of an electronic module from a vehicle on which said module is mounted, characterized in that it comprises:
   an inductance or any type of magnetic sensor inseparably associated with the module,
   an element made of ferromagnetic material connected to an element of the vehicle,
   means of connecting the inductance and the module to the vehicle, in the immediate vicinity of the element made of ferromagnetic material,
   and means of monitoring a magnetic parameter of the inductance and/or the current passing through the inductance and/or the voltage at the terminals of the inductance, designed to detect a variation of said parameters, current or voltage monitored, and to order the emission of a signal indicating the separation of the module from the element of the vehicle to which it was connected, on detecting a variation of the parameter and/or of the current and/or of the voltage monitored, greater than a predetermined variation threshold.

Advantageously according to the invention, each module (provided with its inductance) is designed to be connected to the vehicle or to an element connected to the latter.

Furthermore, the detection device according to the invention advantageously comprises means of electrically powering the inductance, comprising a current source connected in such a way as to power said inductance.

According to a first advantageous embodiment, the inductance comprises a solenoid and an element made of ferromagnetic material consisting of a core designed to be connected to the vehicle in such a way as to extend longitudinally inside the solenoid.

Furthermore, according to this embodiment, and advantageously, the means of electrically powering the solenoid can comprise a direct current source, the monitoring means being designed to measure the intensity of said direct current. Furthermore, these means of electrically powering the solenoid advantageously comprise means of chopping the direct current.

According to another advantageous embodiment aimed at the means of electrically powering the solenoid, the latter can include an oscillator designed to deliver an oscillating current, the monitoring means being designed to monitor the amplitude variations of the intensity of said oscillating current.

Furthermore, the oscillator of the means of electrically powering the solenoid is advantageously designed to deliver a square-wave current, or a current of any other variable form, periodic or otherwise.

According to a second advantageous embodiment, the element made of ferromagnetic material consists of a magnetized bar designed to be connected to the vehicle in the immediate vicinity of the inductance.

Furthermore, the means of electrically powering the magnetized bar advantageously comprise a direct current source, the monitoring means being designed to monitor the voltage of said direct current.

Figure 4:
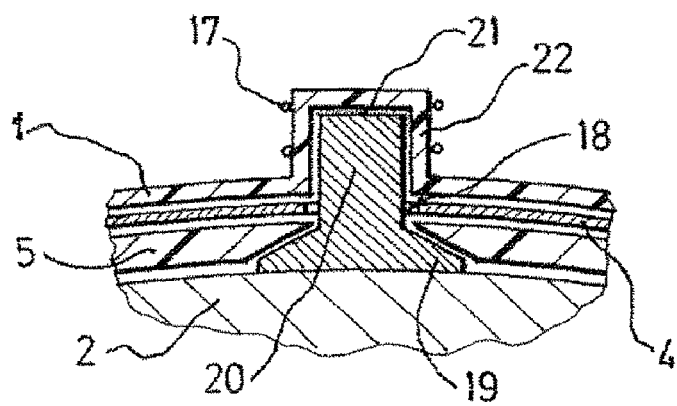
Figure 5:
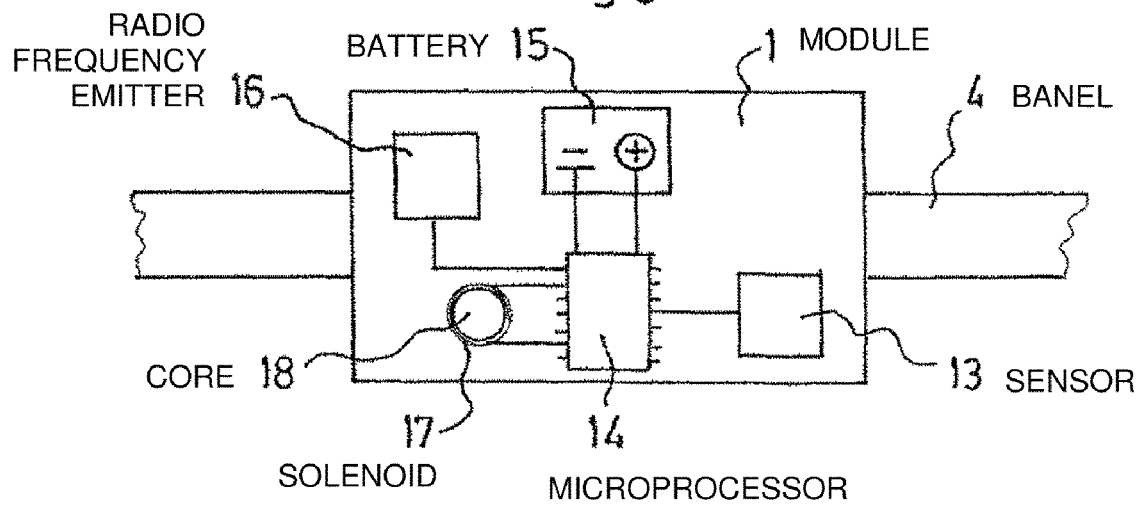
Figure 6A:
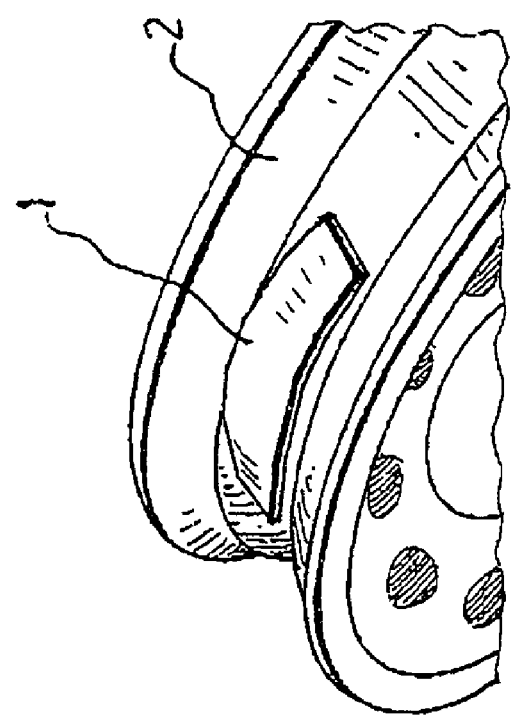
Figure 6B:
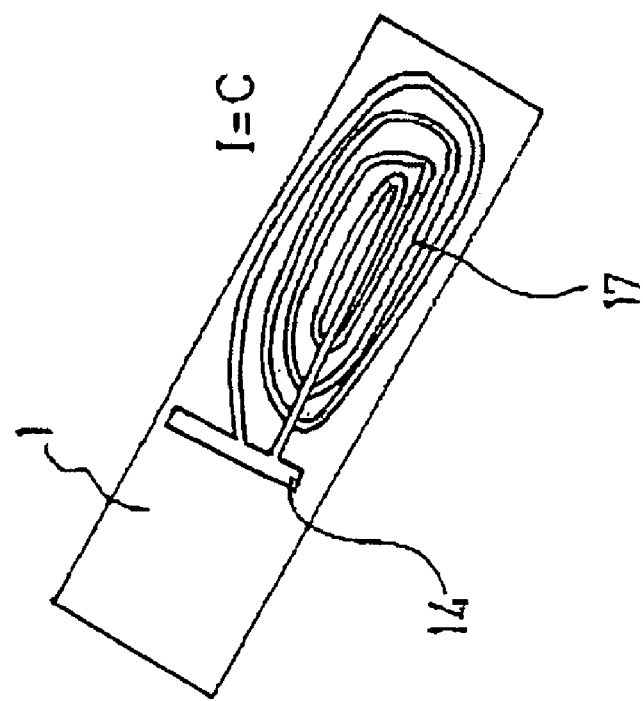
Figure 7A:
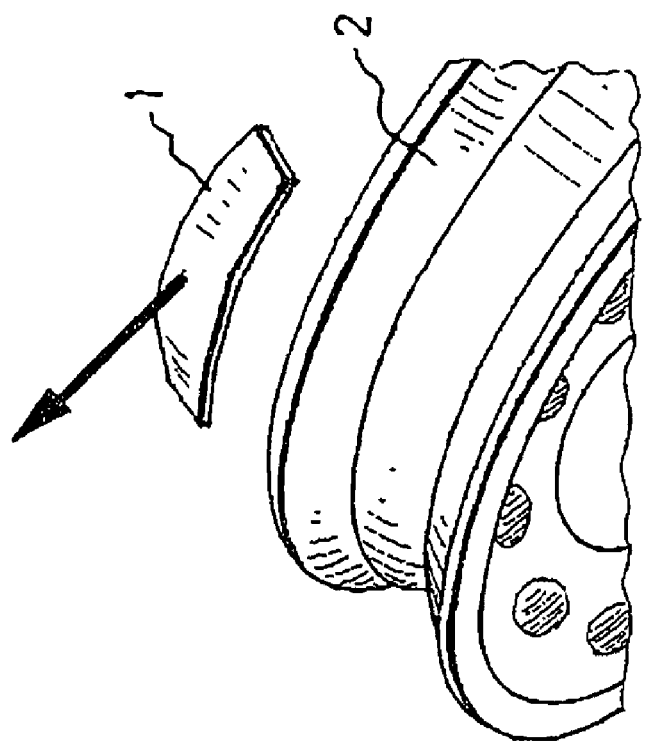
Figure 7B:
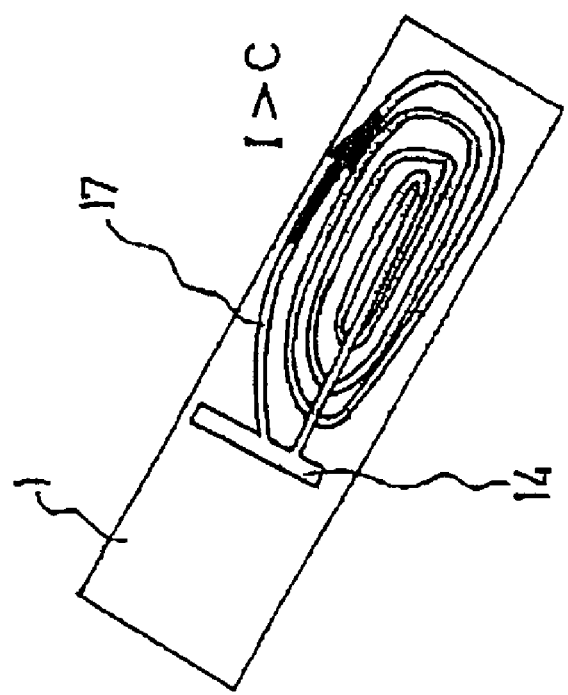

Other characteristics, aims and advantages of the invention will become apparent from the detailed description that follows, given with reference to the appended drawings which represent, by way of non-limiting examples, two preferred embodiments, and an exemplary application of the invention to a system for monitoring the pressure of the tires of a vehicle. In these drawings:

FIG. 1 is an electrical circuit diagram of a first embodiment of detection device according to the invention, FIG. 2 is an electrical circuit diagram of a second embodiment of detection device according to the invention, FIG. 3 is a partial diagrammatic cross section, through a diametral plan, of a rim fitted with an electronic module (shown not in cross section) incorporating a detection device according to the invention of the type represented in FIG. 1, FIG. 4 is a partial enlarged representation of a detail of FIG. 3 (with the electronic module shown in cross section), FIG. 5 is a top diagrammatic view of the electronic module shown open without cover, FIGS. 6a and 6b are drawings respectively of a rim fitted with a detection device according to the invention (FIG. 6b) and this detection device (FIG. 6a), and FIGS. 7a and 7b are diagrams corresponding to the diagrams of FIGS. 6a and 6b, after the detection device has been separated from the rim.

The detection device according to the invention is intended to be associated with an electronic module mounted on the vehicle, so as to detect any separation of said electronic module from said vehicle, and to order the emission of a signal indicating this separation.

According to the diagram shown in FIG. 1, this detection device comprises, firstly, a solenoid 31 intended to be inseparably associated with a module and to be mounted on a vehicle with said module.

This solenoid 31 is incorporated in an electric circuit comprising, connected in series: an electrical power supply source 32 such as a button cell battery, said solenoid, an electrical resistor 33 and a transistor 34 provided with its control logic 35.

The detection circuit according to the invention also comprises a microprocessor 36 connected, on the one hand, to the control logic 35 of the transistor 34, and on the other hand to the terminals of the resistor 33, and programmed to measure (monitor) the intensity of the current passing through said resistor.

Ordinarily, the transistor 34 and its control logic 35 can consist of electronic components. As a variant, however, and conventionally, the transistor function can be the subject of a software solution incorporated in a central processing unit 37 also programmed to handle the abovementioned software functions of the microprocessor 36.

The detection device according to the invention represented in FIG. 1 comprises, secondly, a ferrite core 38 designed to be connected to the vehicle, and to extend longitudinally inside the solenoid 31, when said solenoid and its associated module are correctly mounted on the vehicle. Thus, when the module is correctly connected to the vehicle, the core 38 is inside the solenoid 31.

Based on this diagram, the solenoid 31 can be powered by direct current, the transistor 34 having a switch function controlled in such a way as to chop the current.

The intensity of the current measured (monitored) at the terminals of the resistor 33 is then inversely proportional to the inductance of the solenoid 31 and, on any separation of said solenoid from the core 38 (case occurring when the core 38 exits from the solenoid by separation of the electronic module from the vehicle), a drop in this inductance is observed, and the intensity of the current passing through the solenoid undergoes a variation, the monitoring of which leads to the emission of an indication signaling the separation of the module from the vehicle.

Based on the diagram of FIG. 1, the solenoid 31 can also be powered by alternating current, so conferring on the transistor 34 an oscillator function. The oscillator 34 is designed to deliver a square-wave current or a current with any other form of signal, periodic or otherwise.

A distance between the solenoid 31 and the core 38 is then reflected in an increase in the amplitude of the intensity of the current measured (monitored) at the terminals of the resistor 33.

As an example, when a square-wave signal is emitted, the signal measured is a triangular signal with a slope that is inversely proportional to the inductance of the solenoid 31, and the amplitude of which therefore undergoes a variation on any separation of said solenoid from the core 38.

According to a second embodiment, this detection device according to the invention, of which the diagram is shown in FIG. 2, also comprises a solenoid 41, the terminals of which are shown linked to a microprocessor 42 powered by a battery 44 simultaneously powering said solenoid and microprocessor. This solenoid 41 can also, as a variant, be powered by a variable current, periodic or otherwise.

This detection device also comprises a magnetized bar 43 intended to be connected to the vehicle or to an element of the vehicle (such as the rim), in the immediate vicinity of the solenoid 41.

According to this principle, the magnetized bar 43 induces, in the solenoid 41, field lines that tend to be cancelled on a relative distance of said magnetized bar from said solenoid, leading to the measurable appearance of a voltage peak at the terminals of the solenoid 41.

FIGS. 3 to 5 illustrate an exemplary application of the invention to a detection device intended to be incorporated in a monitoring system provided with a pressure sensor mounted on each wheel of a vehicle, and a central processing unit (not shown) receiving signals emitted by the sensors, comprising a computer incorporating a radiofrequency receiver connected to an antenna, and having an RSSI type output designed to allow analysis of the field level received by said receiver.

More specifically, according to this exemplary application, a detection device according to the invention is intended to be associated with each module of the monitoring system mounted on each wheel of the vehicle, and to be incorporated in the module 1 in which there is conventionally placed a sensor 13 for measuring the pressure and/or the temperature.

According to the example shown in FIGS. 3 to 5, the module 1 is designed to be mounted on the rim 2 of a wheel via a cradle 3 of a shape that is designed to contain said module, said cradle being itself designed to be connected to the rim 2 by gluing and fitting a band 4.

It should, however, be noted that, according to the invention, any other type of fixing of the module on the rim can be implemented, such as direct fixing by gluing . . . , mounting on the inflating valve, and so on . . . .

According to this example, the cradle 3 takes the general form of a U, the interior 5 of which is slightly curved inward so as to be seated on the rim 2, and of which each of the wings 6, 7 includes, at its base, a transverse slot 8 to fit the band 4 typically comprising a metal strap designed to bind the rim 2.

This cradle 3 and module 1 also conventionally comprise means of blocking said module inside said cradle.

Regarding the cradle 3, these blocking means consist, on the one hand, of a return provided in the extension of one of the wings 6, and forming a hook 9 in the form of an inverted U at the end of said wing, and, on the other hand, of a transverse opening 10 provided in an intermediate height position of the other wing 7.

Regarding the module 1, the blocking means are provided projecting from two opposite lateral sides of this module 1, and comprise:

a mating tab 11 of a shape suited to fit in the opening 10 of the cradle 3, an L-shaped hooking member 12 provided projecting from the side opposite to the mating tab 11, and of a shape suited to cooperate with the hook 9 of the cradle 3.

According to this blocking principle, the module 1 is offered up so as to "hook" the hooking member 12 in the hook 9, then a pivot movement (represented by an arrow in FIG. 3) is applied to this module 1 relative to the duly formed hinge axis, to bring it into its blocking position where it is fully contained in the cradle 3 and immobilized in the latter by the locking of the mating tab 11 in the opening 10.

As represented in FIG. 5, conventionally regarding a monitoring system that is the object of the invention, the module 1 also incorporates a pressure sensor 13 linked to a microprocessor 14 powered by a battery 15, and a radiofrequency emitter 16.

The detection device according to the invention firstly comprises, incorporated in the module 1, a solenoid 17, the terminals of which are linked to the microprocessor 14 in such a way as to:

polarize this solenoid 17 by means of the current source formed by the battery 15, monitor periodically, according to the frequency of the internal clock of the microprocessor 14, the intensity of the current passing through this solenoid 17.

This detection device also comprises a ferrite core 18 designed to be fixed to the rim 2 and to extend inside the solenoid 17, centered on the longitudinal axis of symmetry of this solenoid.

This core 18 is made up of a cylindrical pin 20 extending in the axial extension of a truncated base 19 having a circular underside for fixing, for example by gluing, the core 18 to the rim 2.

Moreover, in order to position the cylindrical pin 20 of this core 18 inside and along the axis of the solenoid 17:

the interior 5 of the cradle 3 has an opening provided in it, and the bottom wall of the module 1 has a void forming, on the one hand, on the underside of said module, a cylindrical cavity 21 designed to house the pin 20, and on the other hand, inside said module, a cylindrical lug 22 around which is positioned the solenoid 17.

According to the principle of this detection device, and as illustrated in FIGS. 6a, 6b, 7a and 7b, when the module 1 is correctly positioned in the cradle 3, the solenoid 17 is passed through by a basic current of intensity I=C known constant, determined by the power source formed by the battery 15 (FIGS. 6a and 6b).

However, if the module 1 is torn from the cradle 3, or if the module 1/cradle 3 assembly is separated from the rim 2, the solenoid 17 moves away from the core 18, and the result is, according to the principle of Lenz's law, an upward variation of the intensity of the current passing through this solenoid 17 (FIGS. 7a and 7b).

This intensity variation "wakes up", directly or indirectly (with the inclusion of amplification means), the microprocessor 14 which then orders the emission, via the emitter 16, to the central processing unit of the monitoring system, of a specific alarm signal, on reception of which said central processing unit is programmed to trigger an audible and/or visual indication alarm to the driver.

According to the invention, the driver is then systematically and immediately alerted to the separation of a module 1 from the rim 2 on which it is fixed, and this driver can then react accordingly so as to take the necessary measures: change the wheel involved (conventionally identified by the localization process performed by the monitoring system), stop at a garage, etc.

It should also be noted that the reaction time of the detection device according to the invention is very short (measured in tens of milliseconds), so that the indication is transmitted before the components incorporated in the housing 1 can, if appropriate, be destroyed by the shocks to which this housing is subjected after separation.

As a general rule, for all the embodiments described, it should be noted that the step for monitoring the magnetic parameter of the inductance and/or the current passing through the inductance and/or the voltage at the terminals of the inductance, is performed by continuous or periodic measurement or is triggered by the variation of the parameter and/or the current and/or the voltage monitored.

It will also be noted that the inductance (17, 31, 41) can be replaced by any type of magnetic sensor.

As a general rule, when the choice is made to monitor a magnetic parameter of the inductance (or of a magnetic sensor handling similar functions) in order to detect a separation between the electronic module and the vehicle, it is possible to monitor, for example, the inductance value, the reactance, and so on.

Similarly, it will be noted that the element made of ferromagnetic material can be a magnetized bar or an electromagnet.

The invention claimed is:

1. A method of detecting separation of an electronic module (1) from a vehicle on which the module is mounted, comprising the steps of:

associating with the module (1) an inductance (17; 31; 41) inseparable from said module, the inductance (17; 31; 41) and the module (1) connected to the vehicle in an immediate vicinity of an element (18; 38; 43) made of ferromagnetic material and connected to the vehicle, monitoring one of i) a magnetic parameter of the inductance, ii) a current passing through the inductance, and iii) a voltage at terminals of the inductance (17; 31; 41) so as to detect any variation of the monitored one of the magnetic parameter, the current, and the voltage, detecting a variation of the monitored one of the magnetic parameter, the current, and the voltage, determining the detected variation is greater than a predetermined variation threshold being representative of a relative distance between the inductance (17; 31; 41) and the element made of ferromagnetic material (18; 38; 43) and thereupon ordering an emission of a signal indicating separation of the module (1) from the element of the vehicle, wherein the inductance (17; 31; 41) is polarized by a current source (15; 32; 44) connected so as to power said inductance.

2. The detection method as claimed in claim 1, wherein the element made of ferromagnetic material is one of a magnetized bar (43) and an electromagnet connected to the vehicle in the immediate vicinity of the inductance (41).

3. The detection method as claimed in claim 2, wherein the magnetized bar induces, in the inductance (41), field lines leading to a measurable appearance of a voltage peak at the terminals of the solenoid.

4. The detection method as claimed in claim 1, wherein the inductance comprises a solenoid (17; 31), and an element made of ferromagnetic material comprised of a core (18; 38) capable of being connected to the vehicle in such a way as to penetrate inside the solenoid (17; 31).

5. The detection method as claimed in claim 4, wherein the solenoid (17; 31) is powered by a direct current and voltage variations of the direct current are monitored.

6. The detection method as claimed in claim 5, characterized in that the direct current passing through the solenoid (17; 31) is chopped.

7. The detection method as claimed in claim 4, wherein the solenoid (31) is powered by an oscillating current and amplitude variations of the intensity of the oscillating current are monitored.

8. The detection method as claimed in claim 7, wherein the solenoid (31) is powered by a variable signal.

9. A device for detecting the disconnection of an electronic module (1) from a vehicle on which said module is mounted, comprising:

an inductance (17; 31; 41) inseparably associated with the module (1), an element (18; 38; 43) made of ferromagnetic material and connectable to an element of the vehicle, means for connecting the inductance (17; 31; 41) and the module (1) to the vehicle, in an immediate vicinity of the element made of ferromagnetic material (18; 38; 43), and means (14; 36; 42) for monitoring one of i) a magnetic parameter of the inductance, ii) a current passing through the inductance, and iii) a voltage at terminals of the inductance (17; 31; 41) so as to detect a variation of the monitored one of the magnetic parameter, the current, and the voltage, and to order emission of a signal indicating the separation of the module (1) from the element of the vehicle, on detecting the variation of the monitored one of the magnetic parameter, the current, and the voltage greater than a predetermined variation threshold, and means of electrically powering the inductance (17; 31; 41), comprising a current source (15; 32; 44) connected in such a way as to power said inductance.

10. The detection device as claimed in claim 9, wherein the inductance comprises a solenoid (17; 31), and the element made of ferromagnetic material comprises a core (18; 38) connectable to an element of the vehicle in such a way as to extend inside the solenoid (17; 31).

11. The detection device as claimed in claim 9, wherein the element made of ferromagnetic material comprises one of i) a magnetized bar (43) and ii) an electromagnet, suitable for connection to an element of the vehicle in the immediate vicinity of the inductance (41).

12. The detection device as claimed in claim 11, wherein the means of electrically powering the magnetized bar (43) comprise a direct current source (44), the monitoring means (42) being designed to monitor the voltage of said direct current.

13. The detection device as claimed in claim 10, wherein the means of electrically powering the solenoid (17; 31) comprise a direct current source (15; 32), the monitoring means (14; 36) being designed to monitor the intensity of said direct current.

14. The detection device as claimed in claim 13, characterized in that the electrical power supply means of the solenoid (31) comprise means of chopping (34, 35) the direct current.

15. The detection device as claimed in claim 10, wherein the electrical power supply means of the solenoid (31) comprise an oscillator (34) delivering an oscillating current, the monitoring means (36) being designed to monitor the amplitude variations of the intensity of said oscillating current.

16. The detection device as claimed in claim 15, wherein the oscillator (34) of the electrical power supply means of the solenoid (31) delivers a square-wave current or any other form of signal, periodic or otherwise.

17. The detection device as claimed in claim 9, wherein the inductance comprises a solenoid (17; 31), and the element made of ferromagnetic material comprises a core (18; 38) connectable to the element of the vehicle in such a way as to extend inside the solenoid (17; 31).

18. The detection device as claimed in claim 9, wherein the element made of ferromagnetic material comprises one of i) a magnetized bar (43) and ii) an electromagnet, suitable for connection to the element of the vehicle in the immediate vicinity of the inductance (41).

19. A method of detecting separation of an electronic module (1) from a vehicle on which the module is mounted, comprising the steps of:

associating with the module (1) an inductance (17; 31; 41) inseparable from said module, the inductance (17; 31; 41) and the module (1) connected to the vehicle in an immediate vicinity of an element (18; 38; 43) made of ferromagnetic material and connected to the vehicle, monitoring one of i) a magnetic parameter of the inductance, ii) a current passing through the inductance, and iii) a voltage at terminals of the inductance (17; 31; 41) so as to detect any variation of the monitored one of the magnetic parameter, the current, and the voltage, detecting a variation of the monitored one of the magnetic parameter, the current, and the voltage, determining the detected variation is greater than a predetermined variation threshold being representative of a relative distance between the inductance (17; 31; 41) and the element made of ferromagnetic material (18; 38; 43) and thereupon ordering an emission of a signal indicating separation of the module (1) from the element of the vehicle, wherein, in the monitoring step the monitoring is done by one of i) continuous measurement, ii) periodic measurement, and iii) being triggered by the detected variation, and wherein the inductance comprises a solenoid (17; 31), and an element made of ferromagnetic material comprising a core (18; 38) connectable to an element of the vehicle, in such a way as to penetrate inside the solenoid (17; 31).

* * * * *